United States Patent [19]
Canova, Jr. et al.

[11] Patent Number: 5,414,860
[45] Date of Patent: May 9, 1995

[54] POWER MANAGEMENT INITIALIZATION FOR A COMPUTER OPERABLE UNDER A PLURALITY OF OPERATING SYSTEMS

[75] Inventors: Francis J. Canova, Jr., Boynton Beach, Fla.; Sivagnanam Parthasarathy, Corona Del Mar, Calif.

[73] Assignee: International Business Machines Incorporated, Armonk, N.Y.

[21] Appl. No.: 649,785

[22] Filed: Jan. 29, 1991

[51] Int. Cl.⁶ .................. G06F 9/445; G06F 1/26
[52] U.S. Cl. .................. 395/750; 395/700; 364/280.2; 364/948.4; 364/948.1; 364/DIG. 2
[58] Field of Search .......... 364/200, 900; 395/750, 395/700

[56] References Cited

U.S. PATENT DOCUMENTS

| | | | |
|---|---|---|---|
| 4,203,153 | 5/1980 | Boyd | 364/200 |
| 4,409,665 | 10/1983 | Tubbs | 364/707 |
| 4,590,553 | 5/1986 | Noda | 395/750 |
| 4,597,084 | 6/1986 | Dynneson et al. | 364/200 |
| 4,675,814 | 6/1987 | Murai et al. | 395/425 |
| 4,698,748 | 10/1987 | Juzswik et al. | 371/66 |
| 4,744,048 | 5/1988 | Blanset et al. | 395/400 |
| 4,747,040 | 5/1988 | Blanset et al. | 395/650 |
| 4,768,149 | 8/1988 | Konopik et al. | 395/275 |
| 4,779,187 | 10/1988 | Letwin | 364/200 |
| 4,825,358 | 4/1989 | Letwin | 364/200 |
| 4,843,541 | 6/1989 | Bean et al. | 395/275 |
| 4,851,987 | 7/1989 | Day | 395/750 |
| 4,979,106 | 12/1990 | Schneider | 395/700 |
| 4,980,836 | 12/1990 | Carter et al. | 364/200 |
| 5,027,273 | 6/1991 | Letwin | 395/400 |
| 5,041,964 | 8/1991 | Cole et al. | 395/425 |
| 5,134,580 | 7/1992 | Bertram et al. | 364/900 |

*Primary Examiner*—Thomas C. Lee
*Attorney, Agent, or Firm*—Martin J. McKinley

[57] ABSTRACT

Power management interrupt enabling is done after completion of POST by loading either DOS or OS/2 operating systems in accordance with whichever operating system the computer is setup to operate under. After being loaded, the operating system then enables the PMIs. This provides a very simple solution that allows the PMIs to be used in a computer operable under a plurality of operating systems.

7 Claims, 3 Drawing Sheets

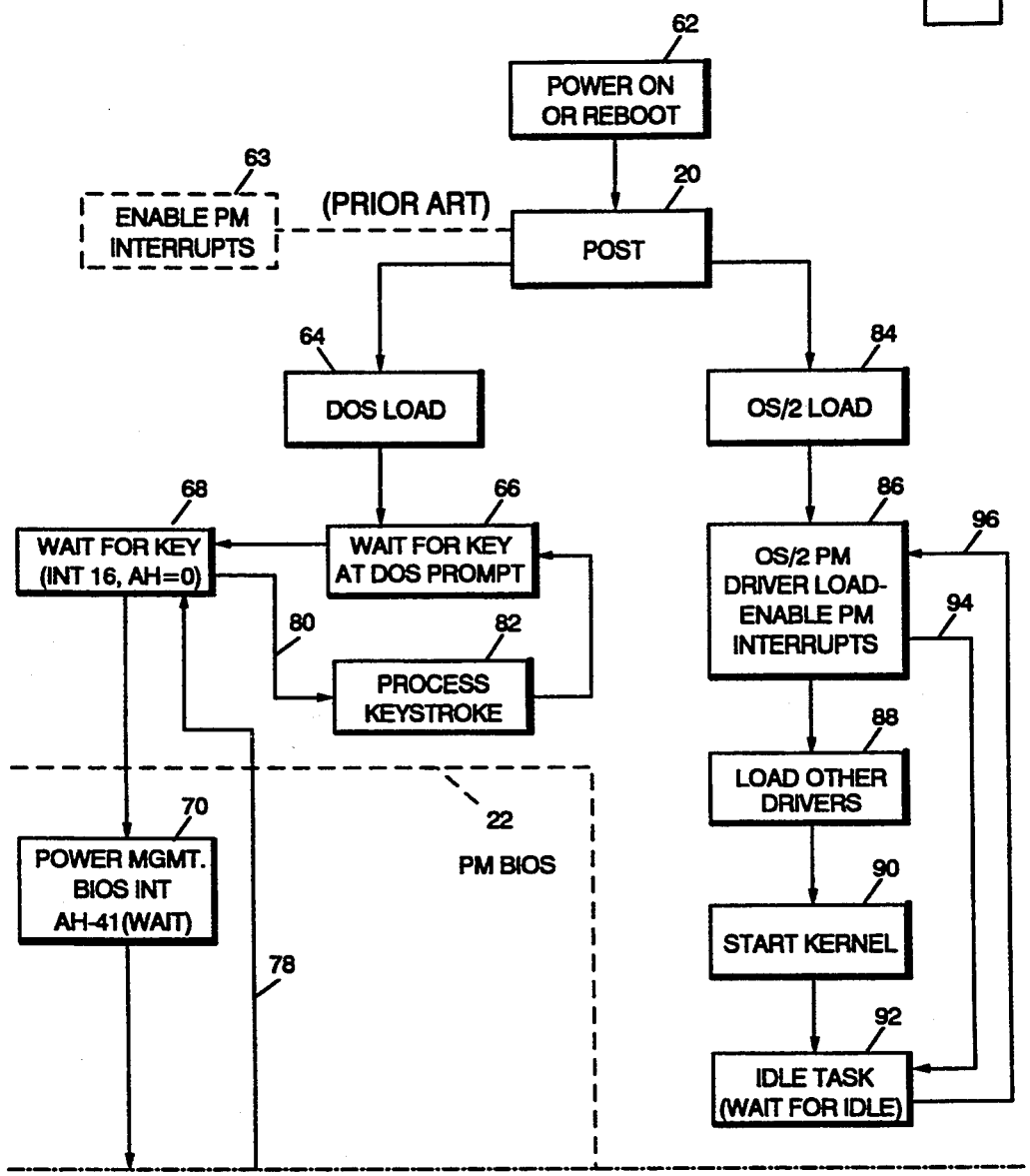

POWER MANAGEMENT INITIALIZATION FOR A COMPUTER OPERABLE UNDER A PLURALITY OF OPERATING SYSTEMS

FIELD OF THE INVENTION

This invention relates to the field of data processing, and, more particularly to method and apparatus for initialization of a power management system in a computer that can operate under a plurality of operating systems.

RELATED APPLICATION

Application Ser. No. 07/647,118, filed Jan. 25, 1991, for BATTERY OPERATED COMPUTER POWER MANAGEMENT SYSTEM, by F. J. Canova, Jr. et al, is incorporated herein by reference and discloses a novel computer in which the present invention is designed to operate, now U.S. Pat. No. 5,230,074.

BACKGROUND OF THE INVENTION

The above related application is directed to a battery operated computer having a sophisticated power management system. Such computer has two processors, a main processor and a power management processor (PMP). The main processor operates under the control of an operating system and provides overall control of the computer for executing application programs. The main processor also assists in power management by executing power management interrupt handlers and controlling a power control register to turn power on and off to various devices. The power management processor monitors ambient temperature and humidity, and battery conditions, and generates interrupts as a result of predetermined changes. Such processor also controls charging of the battery. Logic means are responsive to predetermined conditions to also generate interrupts.

An interrupt controller is connected to the main processor and receives the power management interrupts (PMIs). When such a computer is turned on or is rebooted, it is necessary to initialize the system and enable the PMIs. This enablement links the appropriate interrupt handlers to the PMIs. In a prior art battery operated computer, specifically the IBM model PC-Convertible computer, the initialization including PMI enablement was done during a power on self test (POST). This method can not be used with OS/2 because a protect mode interrupt handler is not loaded until after the OS/2 kernel loads. The prior art technique would allow power management interrupts to occur during the OS/2 load process and since no handler is available at that time, such interrupt would cause the processor to become unstable and crash.

SUMMARY OF THE INVENTION

One of the objects of the invention is to provide an improved power management initialization for a computer that is operable under a plurality of operating systems, such as DOS and OS/2, which run in a real mode and in a protected mode.

Another object of the invention is to initialize a computer that runs under both DOS and OS/2 operating systems, so as to enable power management interrupts in a manner compatible to both operating systems.

Briefly, in accordance with the invention, PMI enabling is done after completion of POST by loading either DOS or OS/2 operating systems in accordance with whichever operating system the computer is setup to operate under. After being loaded, the operating system then enables the PMIs. This provides a very simple solution that allows the PMIs to be used in a computer operable under a plurality of operating systems.

DRAWINGS

Other objects and advantages of the invention will be apparent from the following description taken in connection with the accompanying drawings wherein:

FIG. 1 is a block diagram of a battery operated computer embodying the invention; and FIG. 2 is a flow chart illustrating operation of the invention.

DETAILED DESCRIPTION

Figure 1:
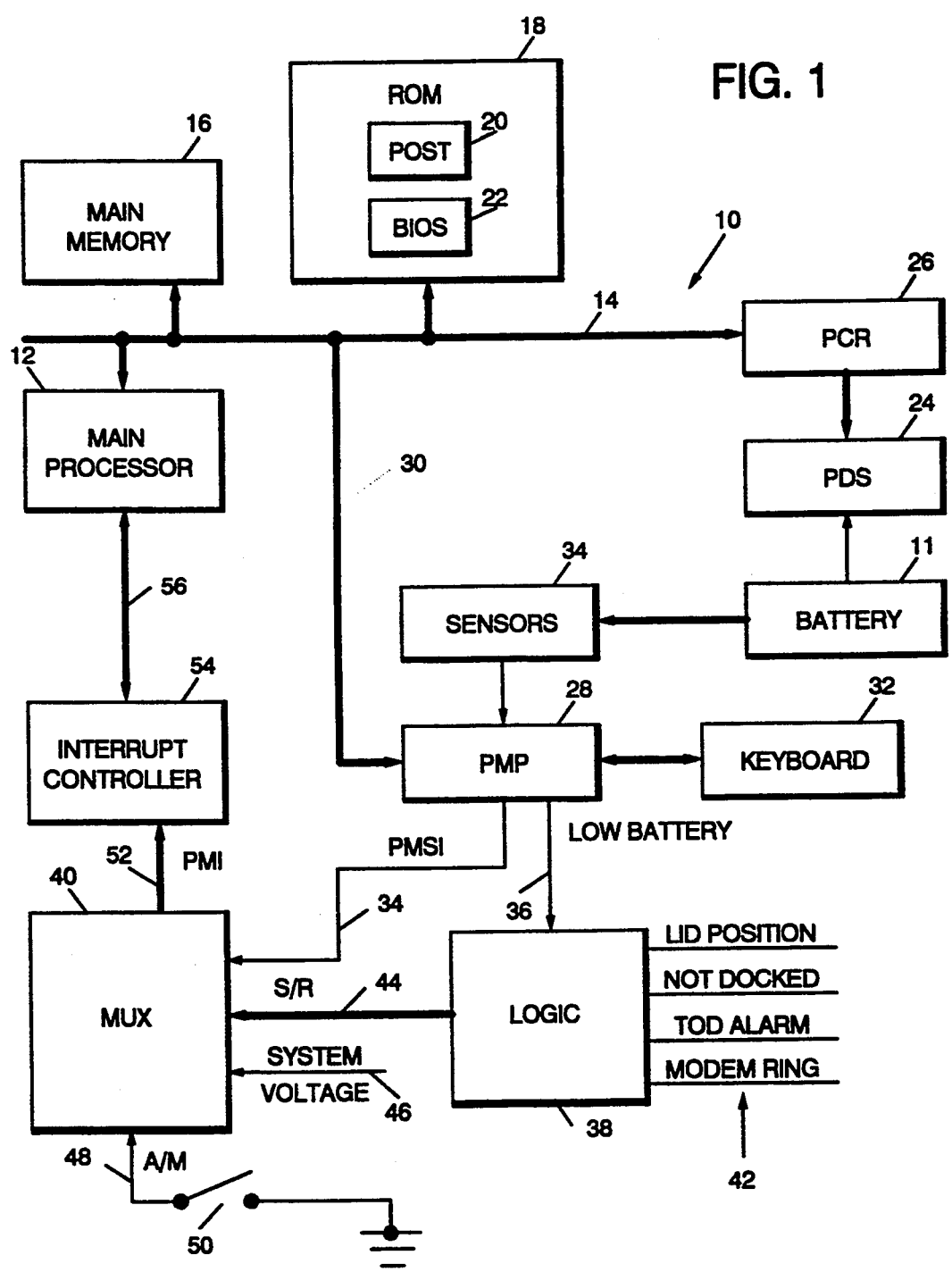

Referring now to the drawings, FIG. 1 generally shows a computer 10 the details of which are more fully disclosed in the above identified application to which reference may be had for further details not disclosed herein. Computer 10 comprises a main processor 12 connected to a system bus 14. A main memory 16 is connected to bus 14 for storing application operating system and application programs for execution by processor 12. A read only memory (ROM) 18 is also connected to bus 14 and comprises or stores a POST program 20 and basic I/O operating system (BIOS) programs 22. Such BIOS programs include a power management (PM) BIOS comprising various interrupt handlers for handling the various PMIs. Main processor 12 is a high performance microprocessor such as an 80386SX microprocessor that is operable in two modes, a real mode, which is non-protected, and a protected mode.

Computer 10 is selectively operable with power from a battery 11 or from an ac power source (not shown). Battery 11 is connected to a power distribution system (PDS) 24 which operates under the control of settings of a power control register (PCR) 26. PCR 26 is connected to bus 14 and is set or controlled by processor 12 executing PM BIOS.

A power management processor (PMP) 28 is connected by a bus 30 to bus 14 and together with processor 12, execute and perform the power management functions for operating computer 10. PMP 28 is also connected to a keyboard 32 and in addition to performing the PM functions PMP 28 manages the keyboard.

A plurality of sensors 34 are connected to PMP 28 to monitor or measure environmental and battery conditions including ambient temperature and humidity, and battery voltage, current, and temperature. In response to such measurements, PMP 28 determines the energy level of battery 11 and generates a low battery signal on line 36 when the battery becomes discharged and needs replacement or recharging. PMP 28 also generates a PM software interrupt (PMSI) signal on line 34 when there is a watchdog timeout, extreme temperature, or low battery condition. The PMSI signal is fed into a multiplexer or MUX 40. Various other conditions produce signals that are analyzed by logic 38 to produce suspend and resume (S/R) interrupts on lines 44, the signals being a LID POSITION signal indicating when the computer lid has been opened or closed, a NOT DOCKED signal indicating the computer is not connected to a docking station, a TOD ALARM signal generated at a preset time of day, and a MODEM RING signal generated when a modem rings for transmitting information to computer 10.

MUX 40 has two additional input lines 46 and 48. Line 46 receives a signal SYSTEM VOLTAGE when the system voltage is at or above a predetermined level (5 volts). It is used when a discharged battery is replaced by a charged battery and the system voltage becomes normal upon connection to the charged battery. It is also used when the computer is in a suspend mode and is then attached to an ac power source. Line 48 transmits an A/M signal when the position of a switch 50 is changed. Switch 50 has two settings or positions, an "automatic" and a "manual" which allow the user to select a preset speed at which to run processor 12 or to allow the computer to automatically select the processor running speed.

Thus, MUX 40 receives a plurality of interrupts or requests therefor. MUX 40 polls the input lines on a round robin basis and when it notes an active signal on one of the lines, it outputs onto lines 52 a power management interrupt (PMI) along with a three-bit code identifying the specific interrupt. Lines 52 are connected to interrupt controller 54. The interrupt request from MUX 40 is transmitted on a specific one of plural interrupt request lines into controller 54. In response to receiving the interrupt from MUX 40, controller 54 transmits an interrupt request to processor 12 on one of lines 56. When processor 12 is able to handle the interrupt, it acknowledges such request and then controller 54 transmits to the processor a vector identifying the specific PM interrupt handler for processing such interrupt. Processor 12 thereupon accesses the desired handler in BIOS 22 and executes it accordingly. Obviously, the above process presupposes that PM interrupts have been enabled.

Figure 2B:
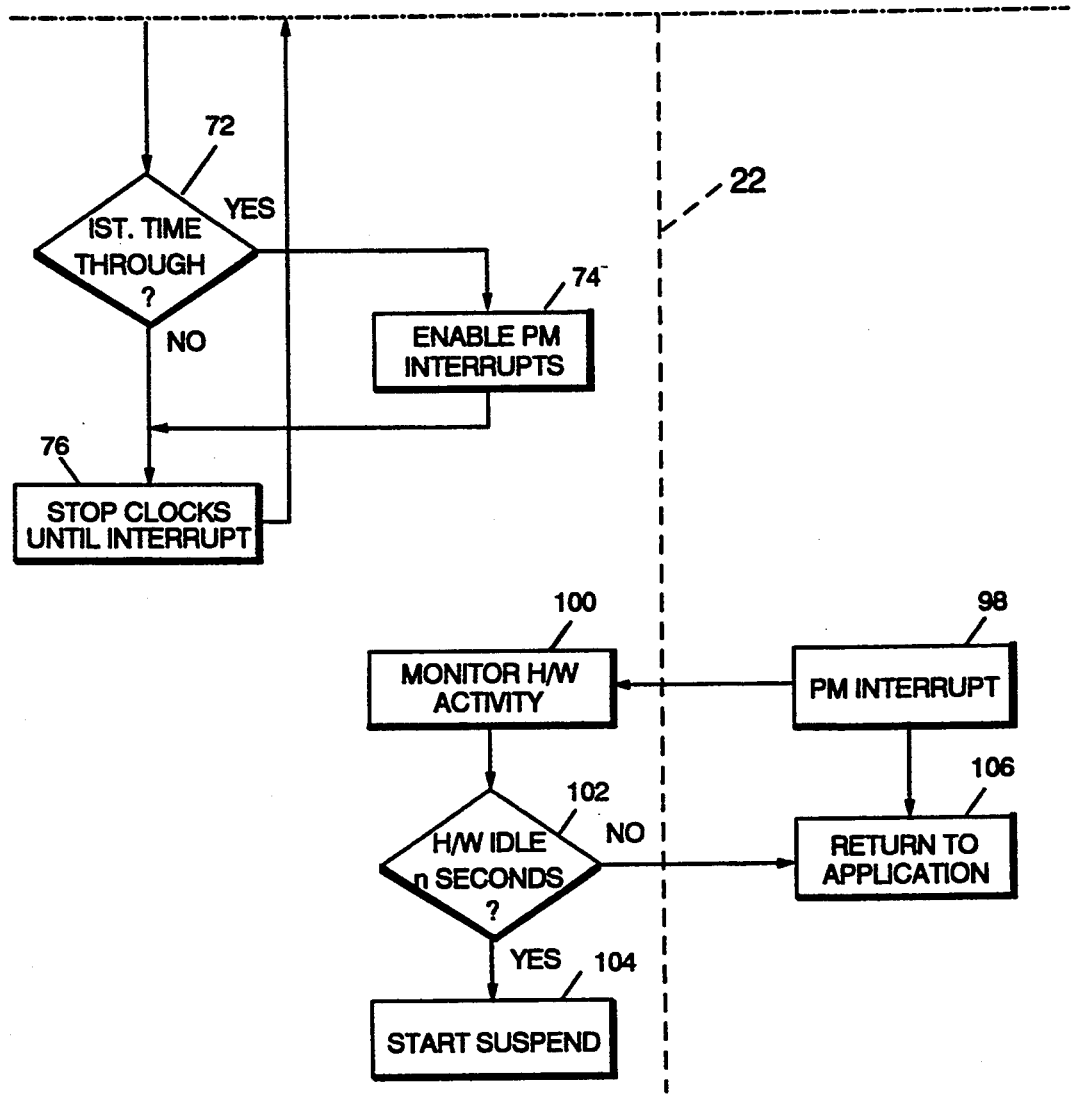

Processor 12 receives two types of interrupts, maskable and non-maskable. A PM interrupt is a maskable interrupt. When the computer is initially turned on, or when it is subsequently rebooted, the computer is initialized and one step of such initialization involves enabling PM interrupts. Thus, with reference to FIG. 2, when the computer is powered on or rebooted in step 62, POST routine 20 is first executed in accordance with the above mentioned prior art, the PC Convertible prior art POST routine also performed step 63 to thereupon enable PM interrupts during POST. However, such step precluded being able to load and execute OS/2. Therefore, step 63 is eliminated from the POST routine 20 of the invention. Continuing with the operation of the invention, upon completion of POST 20, an operating system is loaded in accordance with the system setup. Thus, assuming DOS is the desired operating system, step 64 loads it into main memory for execution by processor 12. After DOS is loaded, a DOS prompt appears on the display screen (not shown) and the computer in step 66 waits for a key stroke from keyboard 32. When a key stroke occurs, step 82 processes the stroke and upon completion branches to step 66 to set up a loop for processing subsequent keystrokes. Had the PM interrupts been enabled by step 63 in accordance with the prior art, such processing would have occurred immediately following step 66. However, in accordance with the invention, a plurality of other steps occur between step 66 and step 82.

Step 66 is processed by immediately making a BIOS call in step 68 to issue a "wait for key" call via interrupt 16 and setting processor register AH to 0. PM BIOS 22 is then entered at step 70 by setting AH=41 and issuing an int=15 call. Step 70 then routes or directs that step 72 be the next step. Step 72 decides if this is the first time this string of code or routine is being executed since turning the power on or rebooting the system. If so, step 74 enables power management interrupt in controller 54 by setting an input gate (not shown) connected to line 52. If step 72 results in a negative determination or upon completion of step 74, step 76 then stops processor clocks by shutting off power to the processor until an interrupt occurs. Then step 78 exits PM BIOS 22 and returns to step 68. If the interrupt was caused by a keystroke, step 68 branches along line 80 to step 82 whereupon the keystroke can be processed. If the interrupt was not caused by a keystroke, step 68 enters step 70 to repeat the process until a keystroke occurs.

If the computer is setup to run under OS/2, then step 84 loads the appropriate portions of OS/2 into main memory. Step 84 then loads the PM driver and enables PM interrupts in a manner the same as that described for step 74. Step 88 then loads any other drivers and the operating system kernel is started in step 90. Step 92 is an idle task which is entered from the kernel. Step 92 looks to see if the processor is busy with other tasks. If the processor is not busy, step 92 requests by step 96 that the processor clocks be stopped as with step 76. When that is done, step 94 returns to step 92. When an interrupt subsequently occurs, the processor is started and the interrupt handled.

Thereafter, when computer 10 is operating under either DOS or OS/2, when a PM interrupt occurs at 98, PM BIOS 22 is entered at step 100 to monitor the hardware activity. Step 102 decides if the hardware has been idle (by looking at waiting interrupts in controller 54, for a period of n seconds where n is a value selected by the user or given a system default value. If the hardware has not been idle, step 106 returns to the application. If the hardware has been idle for the time period, step 104 starts a suspend interrupt handler to switch computer 10 into the suspend mode.

It should be apparent to those skilled in the art that many changes can be made in the details and arrangements of steps and parts without departing from the scope of the invention as defined in the appended claims.

What is claimed is:

1. A battery operated computer comprising:
 a main processor operable in a real mode and in a protected mode;
 a main memory for storing application programs and an operating system for execution by said processor, said operating system being one of a group of a disk operating system (DOS) executable during said real mode of operation of said main processor and a multitasking operating system (MOS) executable in said protected mode of operation of said main processor;
 a read only memory (ROM) storing a plurality of power management interrupt handling (PMIH) routines:
 power management means for monitoring environmental and battery conditions in said computer and generating power management interrupts (PMIs) in response to predetermined changes in said environmental and battery conditions;
 and initialization means operative in response to turning on said computer to load one of said operating systems and place said computer in readiness for execution of an application program, said initialization means comprising a power on self test (POST) program stored in said ROM means, said POST program being executed by said main processor in response to said computer being turned on, to test said computer without enabling said PMIs;

loading means operable when said POST program has completed, to load one of said operating systems into said main memory in accordance with a system setup which determines which operating system said computer will be operated under;

first means operable when said DOS has been loaded into said main memory to enable said PMIs and link said PMIH routines to said PMIs;

and second means operable when said MOS has been loaded into said main memory to first load a power management driver and to then enable said PMIs and link said PMIH routines to said PMIs.

2. A computer in accordance with claim 1 comprising: an interrupt controller connected to said processor and having a selectively gated PMI input line for receiving said PMIs, said interrupt controller being operative to transmit a PMI interrupt to said processor when said PMI input line is gated;

said first and second means being operable to gate said PMI input line and thereby enable said PMIs.

3. A computer in accordance with claim 2 comprising:

a power management basic input output system (BIOS) stored in said ROM and including a callable wait-on-key BIOS routine forming part of said first means whereby in response to a first instance of calling such wait-on-key routine after said computer has been turned on, said PMIs are enabled by said wait-on-key routine.

4. A computer in accordance with claim 3 wherein: said second means is operable to load a kernel of said MOS into said main memory before loading said power management driver, and said second means is further operable after enabling said PMIs to thereafter stop said processor and await an interrupt.

5. A method of initializing a battery operated computer having a main processor operable in a real mode and in a protected mode, a main memory for storing application programs and an operating system for execution by said processor, power management means for monitoring environmental and battery conditions and generating power management interrupts (PMIs) in response to predetermined changes in said environmental and battery conditions, and a read only memory (ROM) storing power management interrupt handlers (PMIHs) for handling said PMIs, said method comprising the steps of:

executing a power on self test (POST) program without enabling said PMIs;

upon completion of execution of said POST program, loading into said main memory an operating system from the group of a disk operating system (DOS) executable in said real mode and a multitasking operating system (MOS) executable in said protected mode, the operating system to be loaded being determined by system setup;

and thereafter enabling said PMIS in accordance with which one of said operating systems is loaded into said main memory whereby said processor is operative upon enabling said PMIs to thereafter execute one of said PMIHs in response to an occurrence of one of said PMIs.

6. A method in accordance with claim 5 wherein said computer comprises an interrupt controller having a PMI line for receiving said PMIs, and said PMIs are enabled by gating said PMIs into said interrupt controller through said PMI line.

7. A method in accordance with claim 5 comprising shutting off said processor after said PMIs are enabled, until an interrupt occurs.

* * * * *